(12) United States Patent
Holgate et al.

(10) Patent No.: US 10,772,785 B2
(45) Date of Patent: Sep. 15, 2020

(54) PERSONAL AUGMENTATION SUIT AND METHOD FOR ASSISTED HUMAN MOTION

(71) Applicant: SpringActive, Inc., Tempe, AZ (US)

(72) Inventors: Matthew A. Holgate, Mesa, AZ (US); Jeffrey A. Ward, Phoenix, AZ (US); Pahul Singh, Mesa, AZ (US); Garrett Repp, Gilbert, AZ (US)

(73) Assignee: SpringActive, Inc., Tempe, AZ (US)

( * ) Notice: Subject to any disclaimer, the term of this patent is extended or adjusted under 35 U.S.C. 154(b) by 190 days.

(21) Appl. No.: 15/674,386

(22) Filed: Aug. 10, 2017

(65) Prior Publication Data

US 2018/0093374 A1 Apr. 5, 2018

Related U.S. Application Data

(60) Provisional application No. 62/477,797, filed on Mar. 28, 2017, provisional application No. 62/403,596, filed on Oct. 3, 2016.

(51) Int. Cl.
*A61H 3/00* (2006.01)
*B25J 9/10* (2006.01)
*B25J 9/00* (2006.01)

(52) U.S. Cl.
CPC .............. *A61H 3/00* (2013.01); *A61H 3/008* (2013.01); *B25J 9/0006* (2013.01)

(58) Field of Classification Search
CPC .......... A41D 13/0007; A41D 2600/108; A41D 13/0537; A61F 5/37; A61F 5/02; A61F 5/026; A61F 5/028; A62B 35/00; A62B 35/0012; A62B 35/0093

USPC ............. 414/2; 2/44, 69, 94; 602/19; 482/43
See application file for complete search history.

(56) References Cited

U.S. PATENT DOCUMENTS 807,908 A * 12/1905 Bradstreet ............ A63B 22/001
                                                                    482/51
3,295,517 A * 1/1967 Stevens ................. A61F 5/0104
                                                                    2/22
4,813,080 A * 3/1989 Toso .................. A41D 13/0007
                                                                    2/44
5,652,957 A * 8/1997 Williford ............... A41D 13/05
                                                                    2/214

(Continued)

FOREIGN PATENT DOCUMENTS

WO        2014109799 A1    7/2014
WO        2014194257 A1    12/2014

*Primary Examiner* — Alissa L Hoey
*Assistant Examiner* — Patrick J. Lynch
(74) *Attorney, Agent, or Firm* — Robert D. Atkins; Patent Law Group: Atkins and Associates, P.C.

(57) ABSTRACT

A human motion assistance device has an upper torso harness for attaching to a user. The upper torso harness has a shoulder strap or backpack assembly. A belt is connected to the upper torso harness and extends around a waist and back area of the user. Leg straps are affixed to the upper torso harness proximate to a gluteal area of the user and configured to extend down a hamstring area to cross in front of a knee area and further extend down a calf area to a foot anchor. The leg straps are made of an elastic material with a pocket around the knee area of the user. The foot anchor may extend under the heel to an arch strap, or cross over the talus and under the arch of the foot. The upper torso harness and leg straps are passive without active members.

21 Claims, 12 Drawing Sheets

(56) References Cited

U.S. PATENT DOCUMENTS

| | | | | |
|---|---|---|---|---|
| 5,716,307 | A * | 2/1998 | Vadher | A43B 7/20 482/124 |
| 5,857,947 | A * | 1/1999 | Dicker | A63B 21/00185 2/69.5 |
| 5,993,362 | A * | 11/1999 | Ghobadi | A63B 21/0004 482/121 |
| 6,129,691 | A * | 10/2000 | Ruppert | A61F 5/026 128/845 |
| 6,190,342 | B1 * | 2/2001 | Taylor | A61F 5/026 602/19 |
| 6,436,065 | B1 * | 8/2002 | Mitchell | A61F 5/01 2/44 |
| 6,450,131 | B1 * | 9/2002 | Broman | A61F 5/026 119/857 |
| 7,553,266 | B2 * | 6/2009 | Abdoli-Eramaki | A61F 5/026 482/124 |
| 7,744,511 | B2 * | 6/2010 | Grigoriev | A61F 5/0102 482/121 |
| 7,757,305 | B2 * | 7/2010 | Toso | A41D 13/0525 2/79 |
| 7,878,996 | B2 * | 2/2011 | Smith, Jr. | A61F 5/028 602/19 |
| 9,144,252 | B1 * | 9/2015 | Kostrzewski | A41D 13/0015 |
| 10,166,426 | B2 * | 1/2019 | Adeeko, Jr. | A63B 21/0557 |
| 2003/0092545 | A1 * | 5/2003 | Koscielny | A61H 1/02 482/124 |
| 2006/0048998 | A1 | 3/2006 | Wolner et al. | |
| 2007/0004570 | A1 * | 1/2007 | Afanasenko | A61F 5/01 482/124 |
| 2008/0011545 | A1 * | 1/2008 | Turner | A62B 35/0012 182/6 |
| 2009/0057360 | A1 | 3/2009 | Demsky | |
| 2010/0125230 | A1 * | 5/2010 | Hurley | A61F 5/026 602/19 |
| 2013/0288863 | A1 | 10/2013 | Yamamoto et al. | |
| 2013/0319793 | A1 * | 12/2013 | Stibilj | A62B 35/0012 182/3 |
| 2014/0208490 | A1 * | 7/2014 | Freixas | A41D 13/0568 2/455 |
| 2015/0173993 | A1 * | 6/2015 | Walsh | B25J 9/0006 414/4 |
| 2016/0107309 | A1 | 4/2016 | Walsh et al. | |
| 2016/0183606 | A1 * | 6/2016 | Shriver | A63B 21/0552 2/69 |
| 2016/0346156 | A1 | 12/2016 | Walsh et al. | |
| 2017/0027735 | A1 | 2/2017 | Wash et al. | |

* cited by examiner

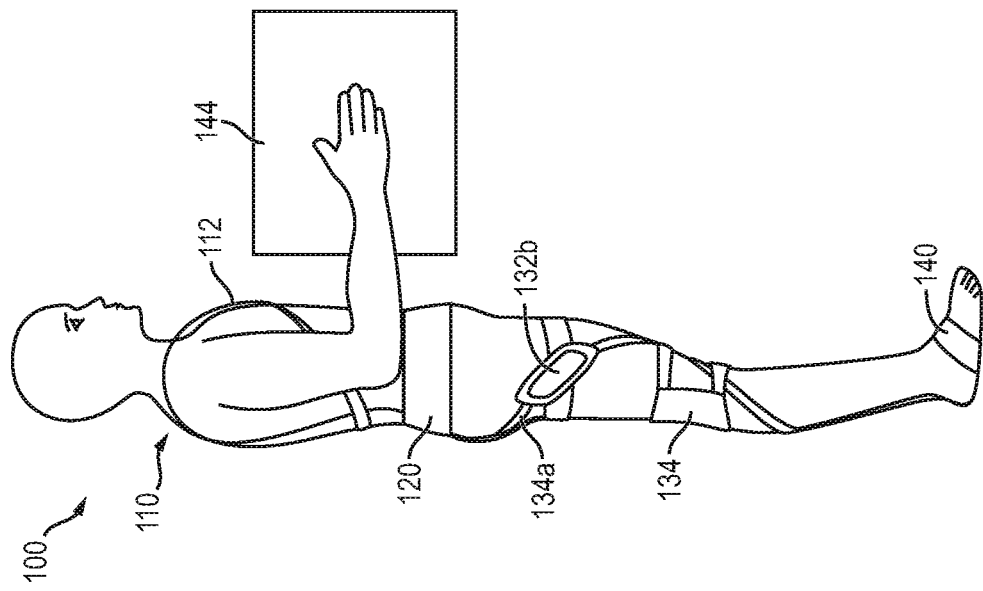
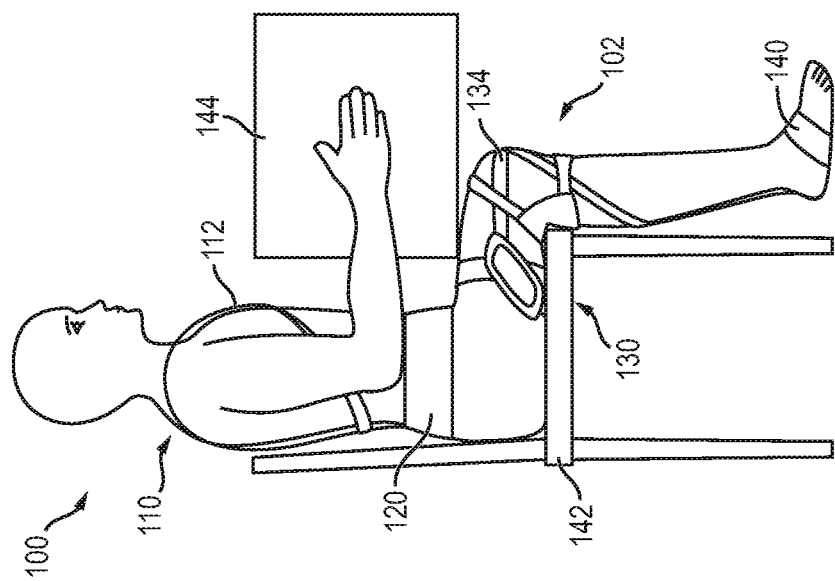

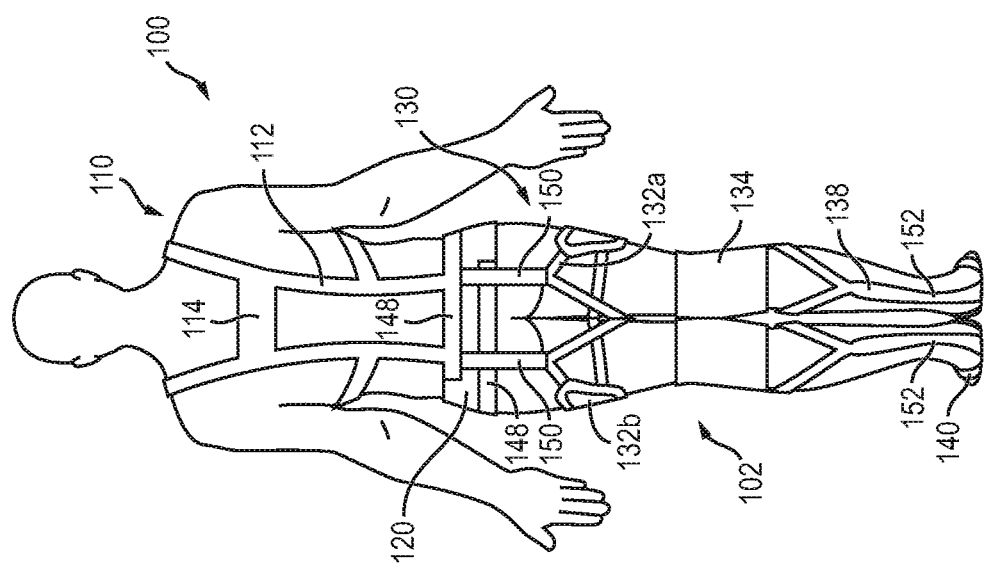
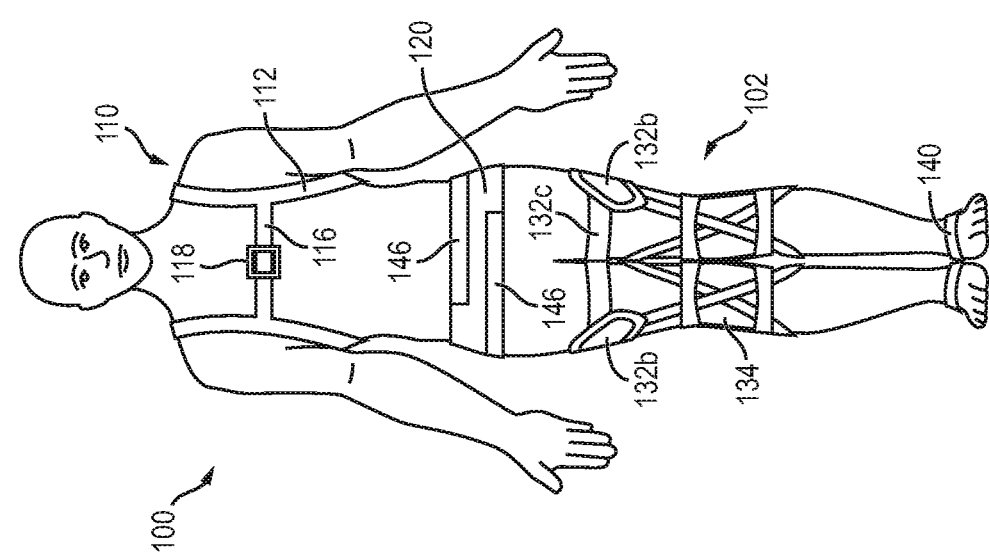

US 10,772,785 B2

PERSONAL AUGMENTATION SUIT AND METHOD FOR ASSISTED HUMAN MOTION

CLAIM TO DOMESTIC PRIORITY

The present application claims the benefit of U.S. Provisional Application No. 62/403,596, filed Oct. 3, 2016 and U.S. Provisional Application No. 62/477,797, filed Mar. 28, 2017, which applications are incorporated herein by reference.

FIELD OF THE INVENTION

The present invention relates in general to a human assistance device, and more particularly, to a personal augmentation suit and method for assisted human motion.

BACKGROUND OF THE INVENTION

A variety of human assistance devices provide aid for human motion. Some work tasks and activities demand frequent and heavy lifting or long-term strenuous movement, beyond normal unassisted physical exertion, and can lead to exhaustion and potential injury. In particular, excessive strain on muscles and joints can cause injury to the back, legs, and knees with associated reduction in productivity. The human assistance device as worn by the user is designed to overcome or compensate for the added load or strain and make many work tasks easier to perform.

In one embodiment, the human assistance device uses an exoskeleton with rigid components e.g., linkages and joints, attached to the user's body. The exoskeleton joints are ideally positioned to have an axis of rotation collinear with a natural axis of rotation for adjacent joints. The rigid exoskeleton relies on a framework of linkages connected to the body at select locations via pads and straps to provide the ability to augment human movements that need assistance or otherwise enhance the user's performance, stability, balance, and safety. As the user flexes or extends their limbs, these rigid links move in parallel with the limb, adding considerable inertia to movement. Unfortunately, the rigid exoskeleton also causes considerable restriction to the user's motion that impedes natural and fluid movement.

In another example, U.S. patent publication 2015/0321339 discloses a soft exosuit that generates forces about one or more joints based on anchor elements and connection elements disposed between the anchor elements. The exosuit uses sensors to determine forces on the anchor or connection elements. Actuators are configured to change tension in the soft exosuit in response to the sensors. The exosuit tends to be complex with an overreliance on active components, such as sensors and actuators, to control its operation. The intricate interconnection of anchor elements, connection elements, sensors, and actuators tends to be expensive to manufacture, difficult to configure, slow in response, and overall low reliability.

BRIEF DESCRIPTION OF THE DRAWINGS

FIGS. 2a-2b illustrate the user transitioning from a seated position to standing position with aid from the passive P2K suit;
FIGS. 3a-3b illustrate elastic bands in the passive P2K suit.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, those skilled in the art will appreciate that the description is intended to cover alternatives, modifications, and equivalents as may be included within the spirit and scope of the invention as defined by the appended claims and their equivalents as supported by the following disclosure and drawings.

Figure 1A:
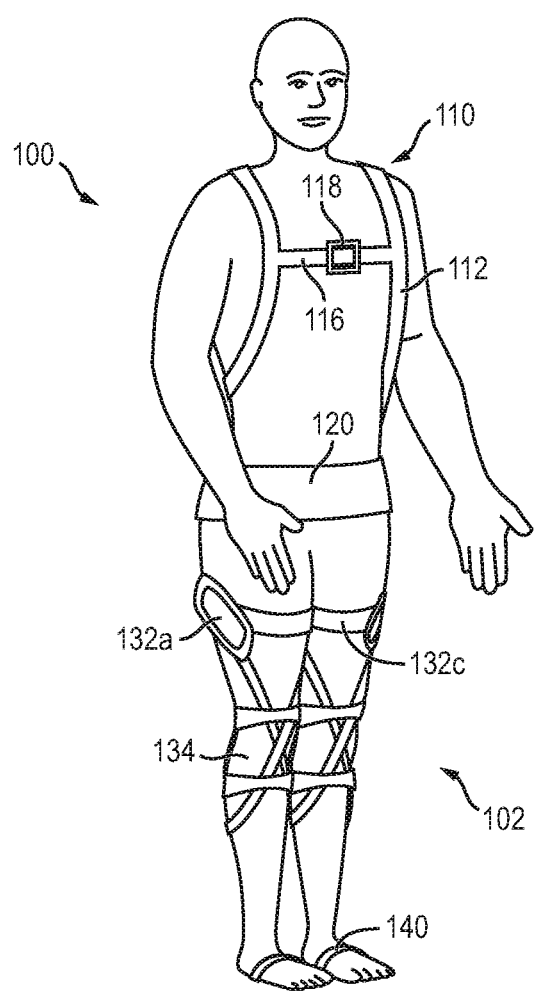
FIGS. 1a-1c illustrate a user wearing a passive P2K suit.
Figure 1C:
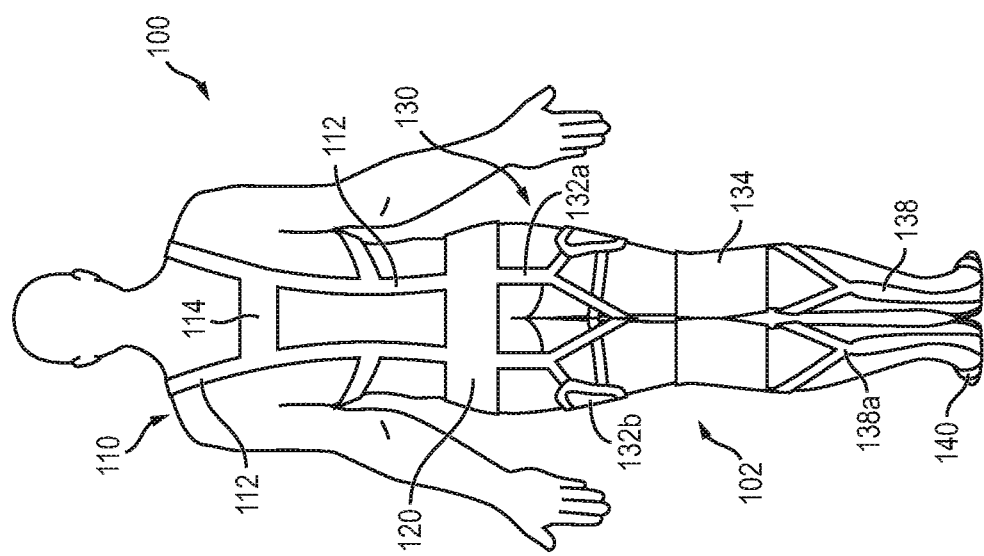
Figure 1B:
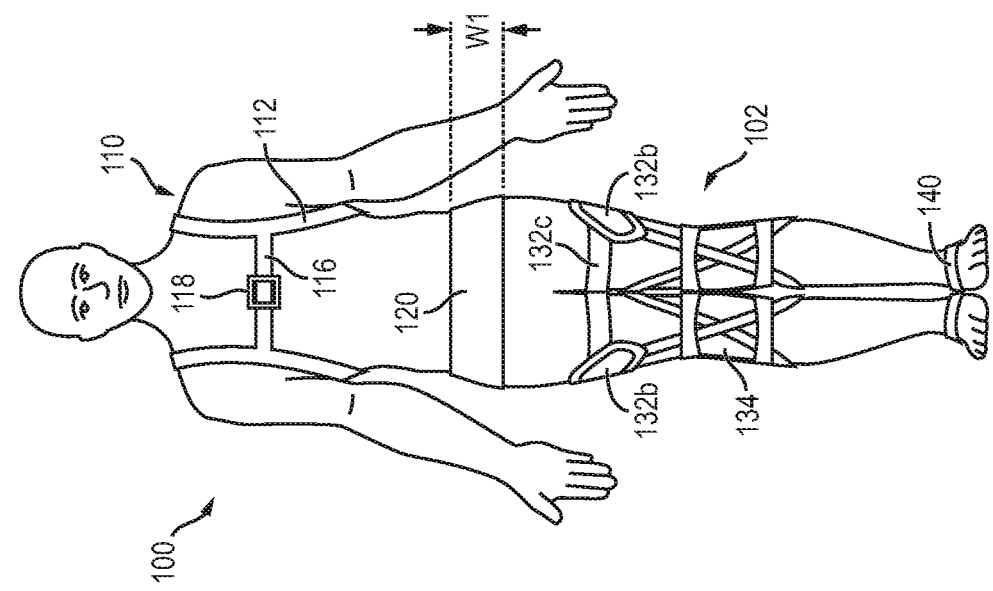

FIG. 1a shows user 100 wearing potential to kinetic suit (P2K) 102 suitable for human assistance in crouching, squatting, and lifting under load. P2K 102 is a passive personal augmentation suit or strapping system, i.e., no active components, applicable to many types of human activity and physical work, such as moving heavy articles, up and down motion under load, and other repetitive, long-term physical exertion. P2K 102 is capable of storing potential energy in the strapping arrangement, e.g., potential energy is stored in elastic strapping when transitioning from a standing position to a crouched or squatting position. The potential energy in P2K 102 is released when user 100 moves from the crouched or squatting position to return upright in stance, thereby assisting the user in the motion, particularly while under load. P2K 102 increases endurance, reduces fatigue, and decreases potential for injury associated with such activity, particularly for the user's back, legs, and knees. P2K 102 includes an interconnected arrangement of straps, belts, and braces to provide passively loaded support and reaction for user 100 while assisting with human motion under load. FIG. 1b shows a front view of P2K 102; FIG. 1c shows a back view of P2K 102.

Upper torso harness 110 includes shoulder straps 112 around the shoulders of user 100, back interconnect strap 114 between shoulder straps 112, front strap 116 with adjustable buckle 118. Back interconnect strap 114 and front strap 116 are affixed to shoulder straps 112 with sewing, rivets, buckles, buttons, adhesive, VELCRO™, or other secure attachment mechanism. Shoulder straps 112 extend down the back of user 100 to waist and back belt 120. Waist and back belt 120 wraps around the waist, hips, and lower back area and secures with VELCRO™ or buckles. In one embodiment, belt 120 has a width W1 of 7-18 centimeters (cm). Shoulder straps 112 can slide within upper torso harness 110 and are affixed to belt 120 with sewing, rivets, buckles, buttons, adhesive, VELCRO™, or other secure attachment mechanism. Waist and back belt 120 provides a brace to support the lower back and tightens to squeeze the hips when squatting.

Thigh straps 130 extend from waist and back belt 120 over the gluteal area and around the thigh area of user 100. Thigh straps 130 connect to belt 120 with sewing, rivets, buckles, buttons, adhesive, VELCRO™, or other secure attachment mechanism. In particular, thigh straps 130 include Y-configured strap 132*a* over the gluteal area and hamstrings, side straps 132*b*, and front straps 132*c* over the quadriceps. Knee support 134 connects to Y-configured strap 132*a* and side straps 132*b* with sewing, rivets, buckles, buttons, adhesive, VELCRO™, or other secure attachment mechanism. Knee support 134 includes a pocket or cavity for the knee of user 100, with support material covering the knee and straps around the knee. Knee support 134 and side straps 132*b* can include pads to provide hard support points for P2K 102. Calf straps 138 connect to knee support 134 with sewing, rivets, buckles, buttons, adhesive, VELCRO™, or other secure attachment mechanism. In particular, calf straps 138 include Y-configured strap 138*a* over the calf of user 100. Foot anchor 140 connects to calf strap 138 with sewing, rivets, buckles, buttons, adhesive, VELCRO™, or other secure attachment mechanism. Foot anchor 140 is configured to connect to a shoe, boot, or directly to the foot, e.g., under and over the foot with an adhesive or sock-like slip-on.

P2K 102 is modular in construction, configuration, and use. P2K 102 can be configured with various combinations of components described in FIGS. 1*a*-1*c*. For example, P2K 102 can be used as waist and back belt 120 with thigh straps 130, knee support 138, calf straps 138, and foot anchor 140, without shoulder straps 112. Configurations with shoulder straps 112 have the advantage of encouraging good posture. The various straps and belts in FIGS. 1*a*-1*c* can be implemented using fabric or leather material, elastic bands, cables, or other suitable flexible connecting members. Springs, pulleys, guides, and other compliant members can be used in place of or to augment the straps and belts within P2K 102. P2K 102 is adjustable for size and pre-tensioning the elastic components.

Consider user 100 wearing P2K 102 in the seated position on seat 142 and holding load 144 in FIG. 2*a*. P2K 102 stores potential energy in the strapping arrangement, e.g., the elastic strapping stretches and stores potential energy when transitioning from a standing position to a crouched, squatting, or seated position. The potential energy in P2K 102 remains available while user 100 is seated to help with the opposing motion, i.e., standing up under load. Waist and back belt 120 provides a brace to support the lower back and tightens to squeeze the hips when sitting. User 100 stands up from the seated position with load 144, as shown in FIG. 2*b*. The potential energy in P2K 102 is released when user 100 moves from the crouched, squatting, or seated position to return upright in stance, thereby assisting the user in the motion, particularly while under load. P2K 102 reduces the effort, strain, fatigue, and potential for injury associated such movement in physical labor work environments. A similar concept applies to user 100 standing from the kneeling or crouching position. In one embodiment, knee support 134 includes a torsional spring to aid with transition from a seated, kneeling, or squatting position to a standing position, without the use of active components. Alternatively, knee support 134 uses elastic bands, or a combination of non-elastic and elastic bands, to assist user 100 in the sit to stand transition.

In general, P2K 102 utilizes a flexible, modular, passive strapping system that, in one embodiment, extends from upper torso harness 110 to waist and back belt 120 and further travels down gluteal area and hamstrings with thigh straps 130 to knee support 134. P2K 102 can further extend from knee support 134 over the calf area with calf straps 138 to foot anchor 140. P2K 102 gains support from upper torso harness 110 and belt 120, as well as the strapping arrangement from the back of the thigh, front of the knee, and back of the tibia to anchor at the foot. Because the straps cross at the waist and over the length of the leg, the strapping arrangement stores energy in the elastic bands or springs during the squatting or crouching motion to be released during transition to the standing position thus assisting with human motion under load. The crossed straps also hold P2K 102 in place during various movements, such as squatting.

Elastic bands have been found to be particularly effective in areas 146 and 148 (belt 120), area 150 (thigh straps 130), and area 152 (calf straps 138) for assisting with human motion under load, as shown in FIGS. 3*a*-3*b*. Elastic bands in areas 146-152 can vary in elasticity and stiffness with any preloading adjustable for the user 100 during the fitting process.

Figure 4B:
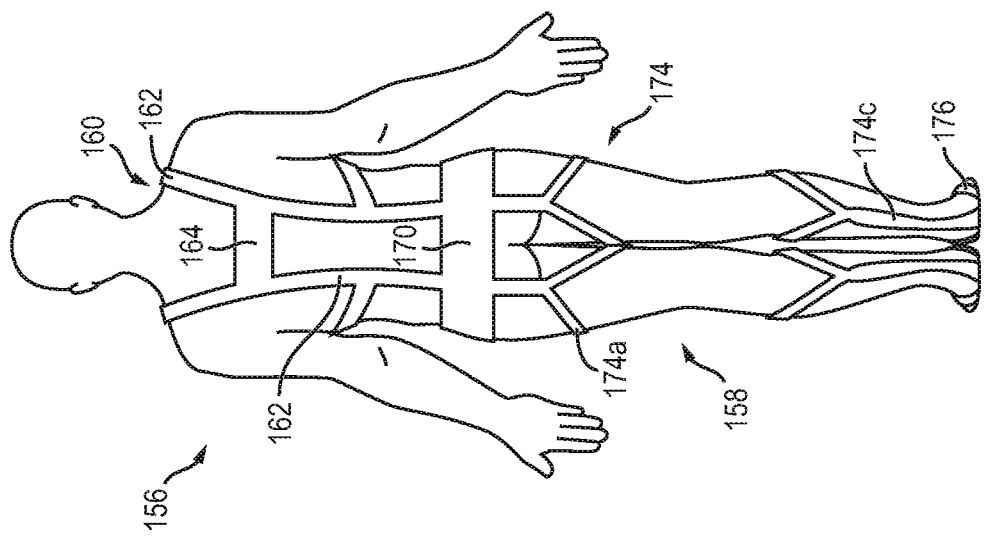
FIGS. 4a-4b illustrate a second embodiment of the passive P2K suit with elastic leg straps.
Figure 4A:
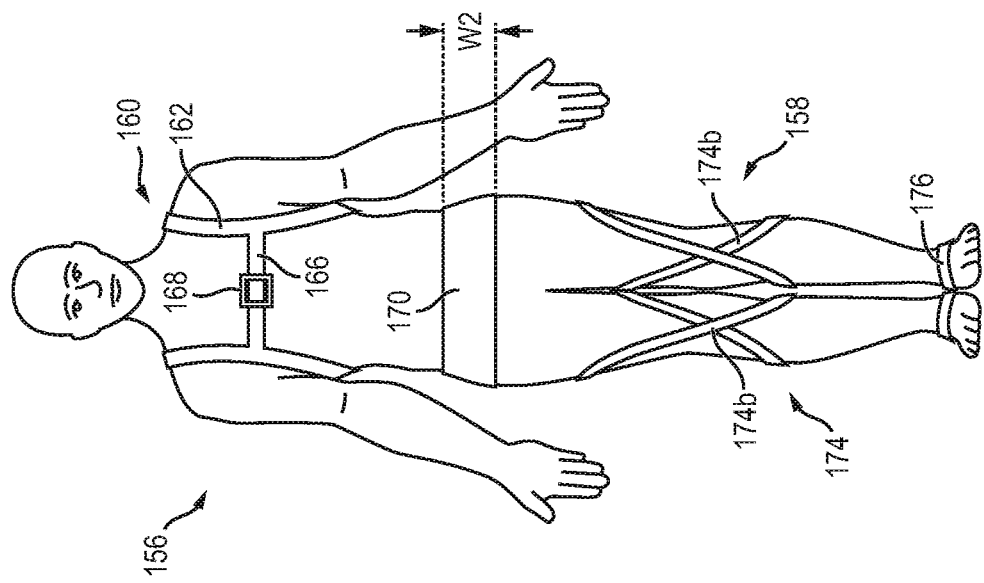

FIGS. 4*a*-4*b* illustrate another embodiment of user 156 wearing P2K 158 suitable for human assistance in crouching, squatting, and lifting under load. FIG. 4*a* shows a front view of P2K 158; FIG. 4*b* shows a back view of P2K 158. P2K 158 is a passive personal augmentation suit or strapping system, i.e., no active components, applicable to many types of human activity and physical work, such as moving heavy articles, up and down motion under load, and other repetitive, long-term physical exertion. P2K 158 is capable of storing potential energy in the strapping arrangement, e.g., potential energy is stored in elastic strapping when transitioning from a standing position to a crouched or squatting position. The potential energy in P2K 158 is released when user 156 moves from the crouched or squatting position to return upright in stance, thereby assisting the user in the motion, particularly while under load. P2K 158 increases endurance, reduces fatigue, and decreases potential for injury associated with such activity, particularly for the user's back, legs, and knees. P2K 158 includes an interconnected arrangement of straps, belts, and braces to provide passively loaded support and reaction for user 156 while assisting with human motion under load.

Upper torso harness 160 includes shoulder straps 162 around the shoulders of user 156, back interconnect strap 164 between shoulder straps 162, front strap 166 with adjustable buckle 168. Back interconnect strap 164 and front strap 166 are affixed to shoulder straps 162 with sewing, rivets, buckles, buttons, adhesive, VELCRO™, or other secure attachment mechanism. Shoulder straps 162 extend down the back to waist and back belt 170. Waist and back belt 170 wraps around the waist, hips, and lower back area and secures with VELCRO™ or buckles. In one embodiment, belt 170 has a width W2 of 7-18 cm. Shoulder straps 162 can slide within upper torso harness 160 and are affixed to belt 170 with sewing, rivets, buckles, buttons, adhesive, VELCRO™, or other secure attachment mechanism. Waist and back belt 170 provides a brace to support the lower back and tightens to squeeze the hips when squatting.

Leg strap arrangement 174 extends down the legs of user 156. Leg straps 174 include Y-configured thigh portion 174*a* over the gluteal area and hamstrings of user 156, cross-configured knee portion 174*b* over the front of the knee area, and Y-configured calf portion 174*c* over the calf area. Thigh portion 174*a* connect to waist and back belt 170 with sewing, rivots, buckles, buttons, adhesive, VELCRO™, or other secure attachment mechanism. Leg straps 174 utilize the bending motion of the ankle and knee for maximum stretching of the elastic bands. Foot anchor 176 connects to calf portion 174c behind the heel with sewing, rivots, buckles, buttons, adhesive, VELCRO™, or other secure attachment mechanism. Foot anchor 176 connects to a shoe, boot, or directly to the foot, e.g., under and over the foot with an adhesive or sock-like slip-on.

P2K 158 is modular in construction, configuration, and use. For example, P2K 158 can be used as waist and back belt 170 with leg straps 174, without shoulder straps 162. The various straps and belts in FIGS. 4a-4b can be implemented using fabric or leather material, elastic bands, cables, or other suitable flexible connecting members. P2K 158 stores potential energy in the strapping arrangement, e.g., potential energy is stored in elastic strapping when transitioning from a standing position to a crouched, squatting, or seated position. The potential energy in P2K 158 is released when user 156 moves from the crouched, squatting, or seated position to return upright in stance, thereby assisting the user in the motion, particularly while under load. P2K 158 is adjustable for size and pre-tensioning the elastic components.

Figure 5B:
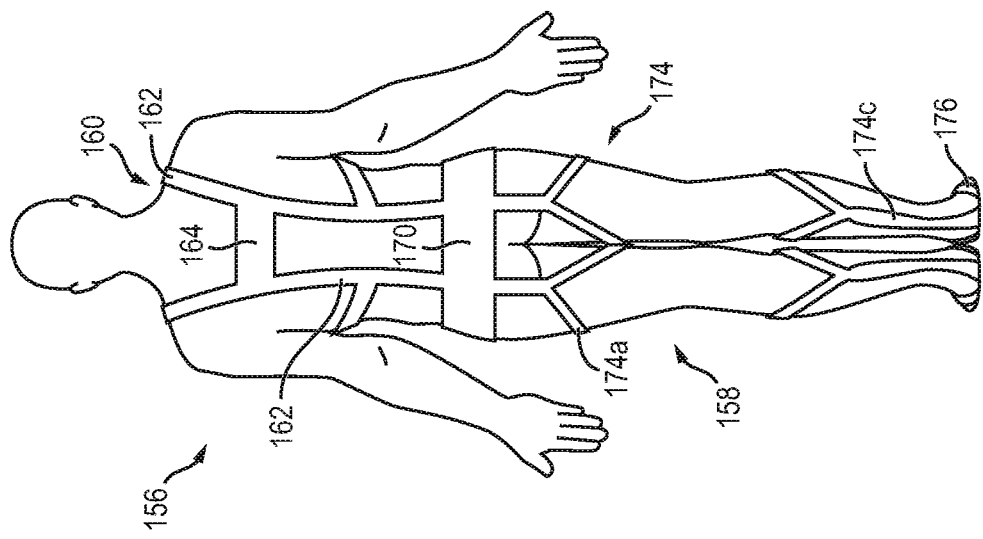
FIGS. 5a-5b illustrate a third embodiment of the passive P2K suit with front torso cross straps.
Figure 5A:
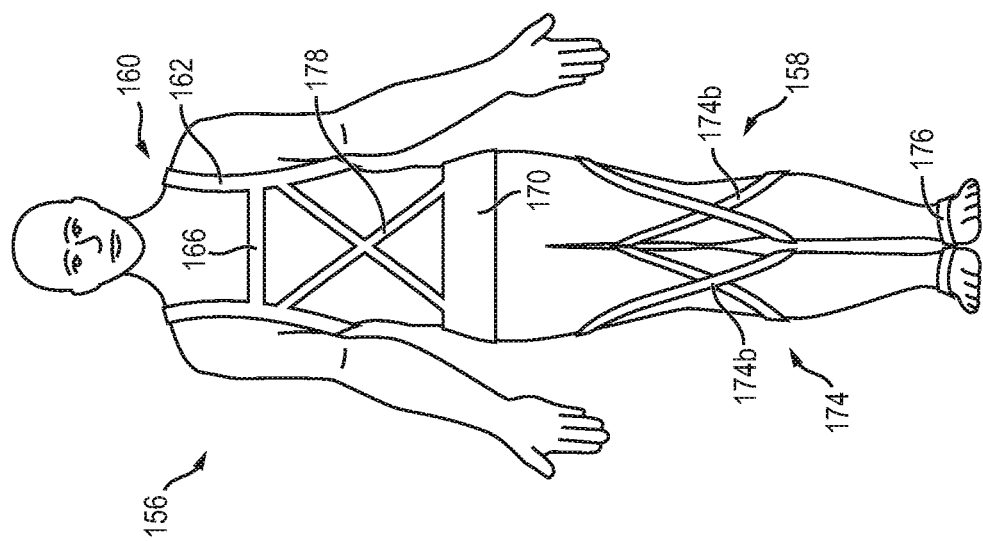

FIGS. 5a-5b illustrate a modified P2K 158, similar to FIGS. 4a-4b, with front torso cross straps 178 for additional support.

Figure 6A:
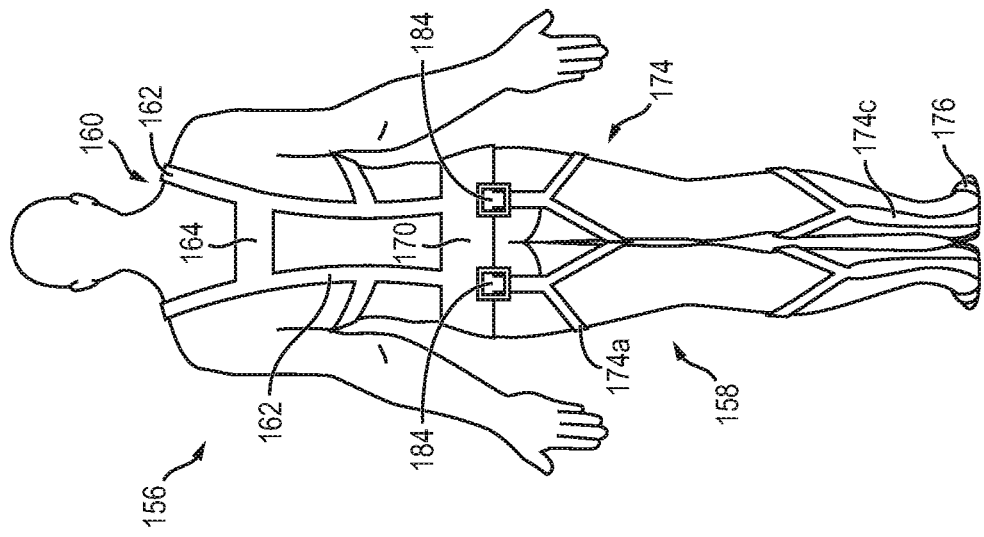
FIGS. 6a-6b illustrate a fourth embodiment of the passive P2K suit with buckles to adjust the upper torso harness.
Figure 6B:
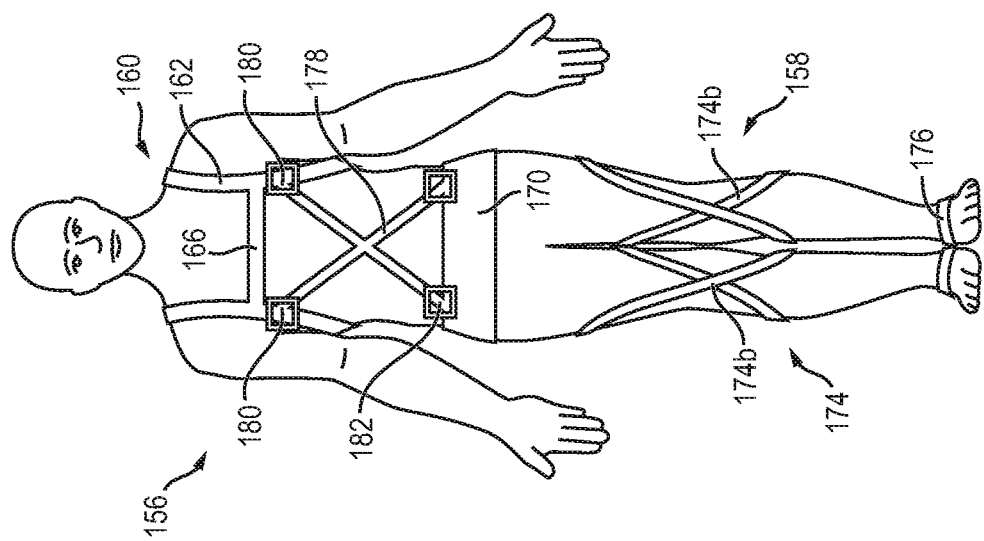

FIGS. 6a-6b illustrate a modified P2K 158, similar to FIGS. 4a-4b, with buckles 180 and 182 for adjustment and attachment points on the front of P2K 158, and buckles 184 for adjustment and attachment points on the back of P2K 158.

Figure 7:
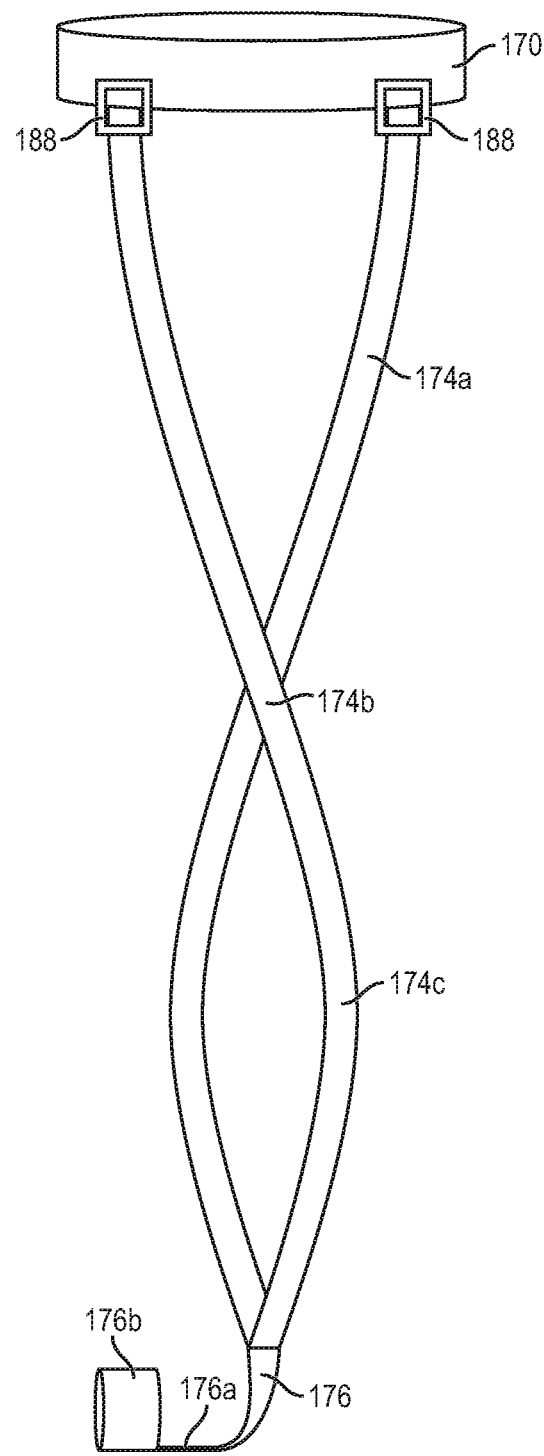
FIG. 7 illustrates further detail of the leg straps and foot anchor.

FIG. 7 shows further detail of leg straps 174 from waist and back belt 170 to foot anchor 176. Leg straps 174 can be made with elastic bands crossing at knee portion 174b, i.e., in front of the knee. Leg straps 174 can include buckles 188 or VELCRO™ for ease of donning and doffing P2K 158. The user's foot slides over heel strap 176a and into arch wrap 176b to fix leg straps 174 in place. Foot anchor 176 can be attached over a shoe.

Figure 8C:
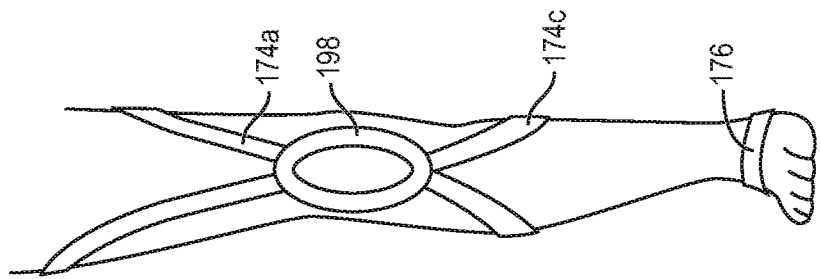
FIGS. 8a-8c illustrate further detail of the leg straps and foot anchor.
Figure 8B:
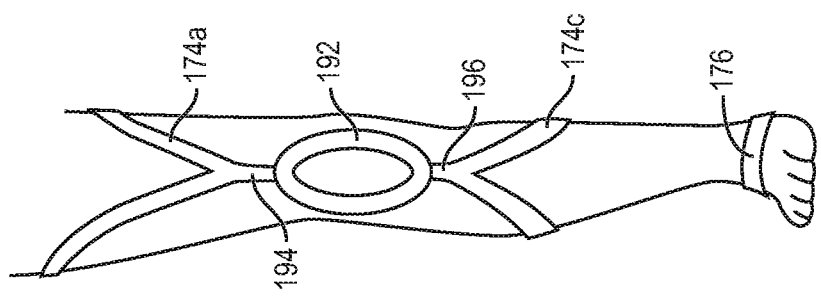
Figure 8A:
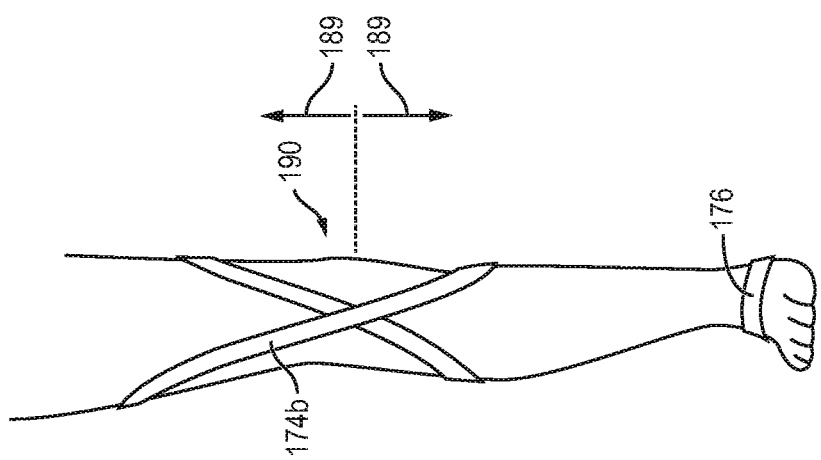

FIG. 8a shows leg straps 174 crossing in front of knee 190. Leg straps can be positioned to cross above, directly on, or below the knee cap, as shown by the range of arrows 189. FIG. 8b shows leg straps 174 crossing above and below the knee with pocket 192 around the knee cap for comfort and stability. A first single strap 194 extends above pocket 192 to thigh portion 174a. A second single strap 196 extends below pocket 192 to calf portion 174c. FIG. 8c shows leg straps 174 crossing in front of the knee with pocket 198 around the knee cap for comfort and stability. Thigh portion 174a connects to an upper point of pocket 198, and calf portion 174c connects to a lower point of pocket 198.

Figure 9B:
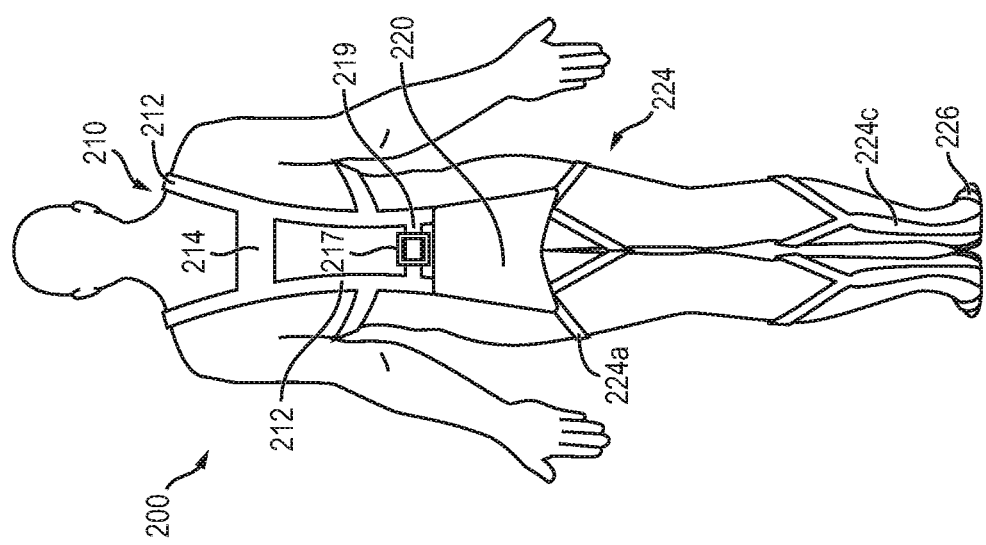
FIGS. 9a-9b illustrate a fifth embodiment of the passive P2K suit with back support.
Figure 9A:
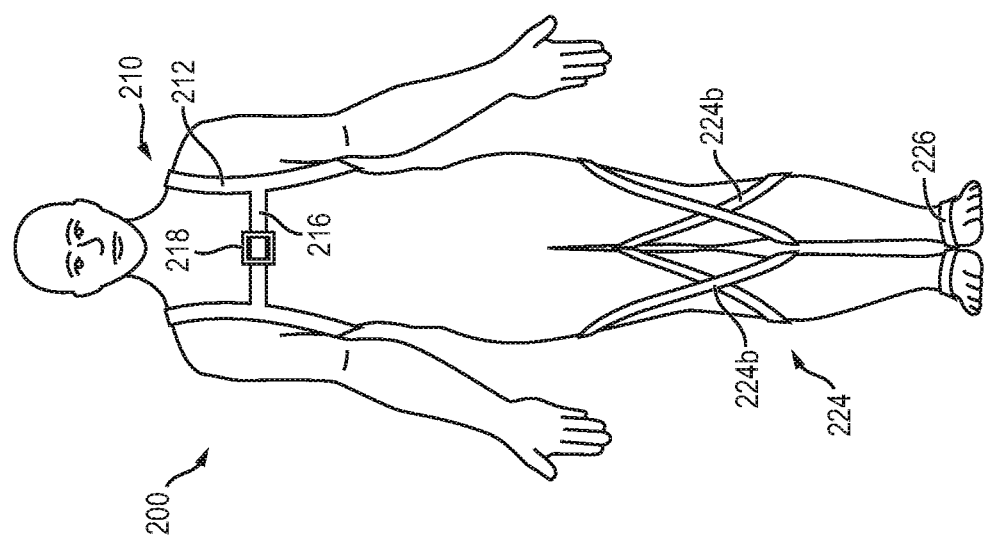

FIGS. 9a-9b illustrate another embodiment of user 200 wearing P2K 202 suitable for human assistance in crouching, squatting, and lifting under load. FIG. 9a shows a front view of P2K 202; FIG. 9b shows a back view of P2K 202. P2K 202 is a passive personal augmentation suit or strapping system, i.e., no active components, applicable to many types of human activity and physical work, such as moving heavy articles, up and down motion under load, and other repetitive, long-term physical exertion. P2K 202 is capable of storing potential energy in the strapping arrangement, e.g., potential energy is stored in elastic strapping when transitioning from a standing position to a crouched or squatting position. The potential energy in P2K 202 is released when user 200 moves from the crouched or squatting position to return upright in stance, thereby assisting the user in the motion, particularly while under load. P2K 202 increases endurance, reduces fatigue, and decreases potential for injury associated with such activity, particularly for the user's back, legs, and knees. P2K 202 includes an interconnected arrangement of straps, belts, and braces to provide passively loaded support and reaction for user 200 while assisting with human motion under load.

Upper torso harness 210 includes shoulder straps 212 around the shoulders of user 200, upper back interconnect strap 214 between shoulder straps 212, front strap 216 with adjustable buckle 218. Back interconnect strap 214 and front strap 216 are affixed to shoulder straps 212 with sewing, rivots, buckles, buttons, adhesive, VELCRO™, or other secure attachment mechanism. Shoulder straps 162 extend down the back to back support 220 and affix with sewing, rivots, buckles, buttons, adhesive, VELCRO™, or other secure attachment mechanism. Lower back interconnect strap 219 is connected above back support 220.

Leg strap arrangement 224 extends down the legs of user 200. Leg straps 224 include Y-configured thigh portion 224a over the gluteal area and hamstrings of user 200, cross-configured knee portion 224b over the front of the knee area, and Y-configured calf portion 224c over the calf area. Thigh portion 224a connects to back support 220 with sewing, rivots, buckles, buttons, adhesive, VELCRO™, or other secure attachment mechanism. Leg straps 224 utilize the bending motion of the ankle and knee for maximum stretching of the elastic bands. Foot anchor 226 connects to calf portion 224c behind the heel with sewing, rivots, buckles, buttons, adhesive, VELCRO™, or other secure attachment mechanism. Foot anchor 226 connect to a shoe, boot, or directly to the foot, e.g., under and over the foot with an adhesive or sock-like slip-on.

P2K 202 stores potential energy in the strapping arrangement, e.g., potential energy is stored in elastic strapping when transitioning from a standing position to a crouched, squatting, or seated position. The potential energy in P2K 202 is released when user 200 moves from the crouched, squatting, or seated position to return upright in stance, thereby assisting the user in the motion, particularly while under load.

Figure 10C:
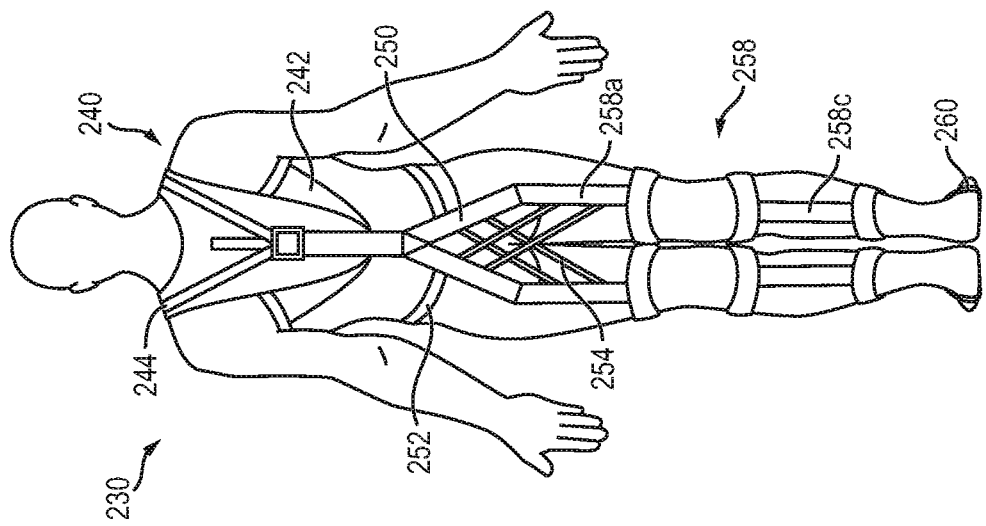
FIGS. 10a-10c illustrate a sixth embodiment of the passive P2K suit with a backpack assembly.
Figure 10B:
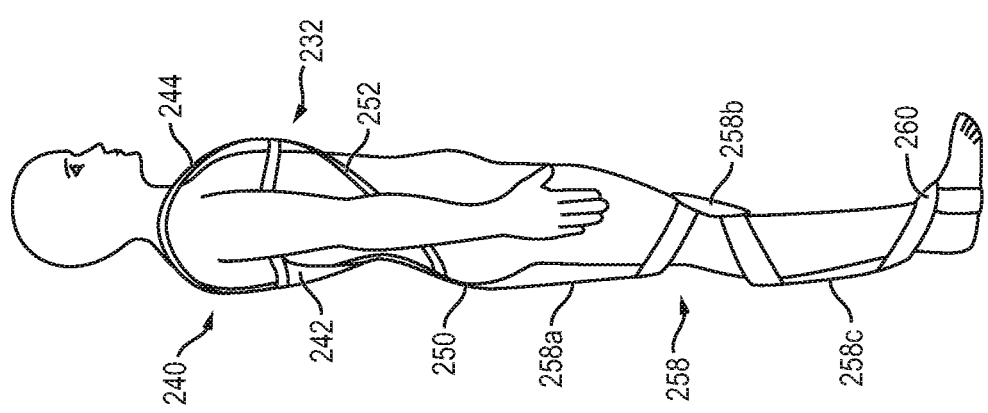
Figure 10A:
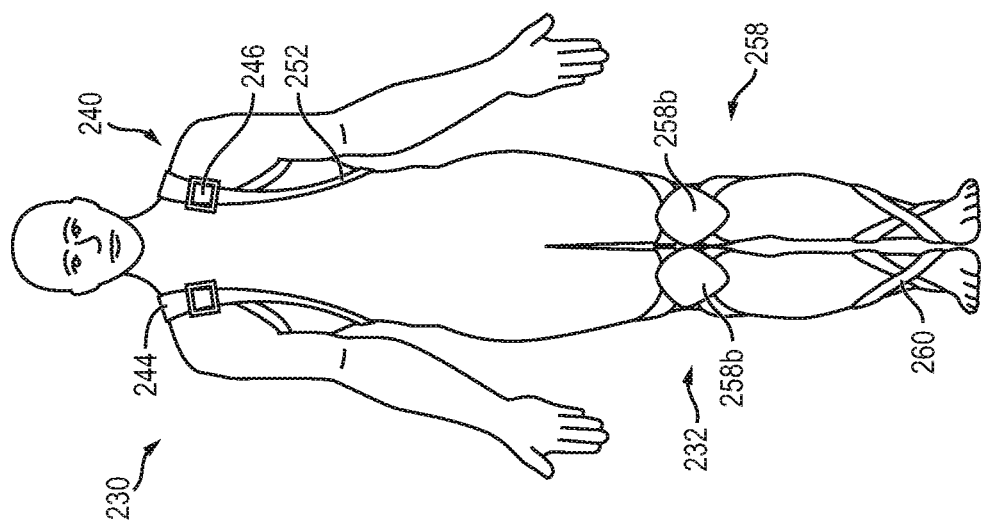

FIGS. 10a-10c illustrate another embodiment of user 230 wearing P2K 232 suitable for human assistance in crouching, squatting, and lifting under load. FIG. 10a shows a front view of P2K 232; FIG. 10b shows a side view of P2K 232; FIG. 10c shows a back view of P2K 232. P2K 232 is a passive personal augmentation suit or strapping system, i.e., no active components, applicable to many types of human activity and physical work, such as moving heavy articles, up and down motion under load, and other repetitive, long-term physical exertion. P2K 232 is capable of storing potential energy in the strapping arrangement, e.g., potential energy is stored in elastic strapping when transitioning from a standing position to a crouched or squatting position. The potential energy in P2K 232 is released when user 230 moves from the crouched or squatting position to return upright in stance, thereby assisting the user in the motion, particularly while under load. P2K 232 increases endurance, reduces fatigue, and decreases potential for injury associated with such activity, particularly for the user's back, legs, and knees. P2K 232 includes an interconnected arrangement of straps, belts, and braces to provide passively loaded support and reaction for user 230 while assisting with human motion under load. Portions of P2K 232 can be reflective material for safety.

Upper torso harness 240 includes backpack assembly 242 with shoulder straps 244. Backpack assembly 242 can be made with an air mesh material with openings to allow for air-flow on the back and reduces the overall weight. Backpack assembly 242 can include a combination of elastic material and webbing material. Backpack assembly 242 covers a portion of back area of user 230 to improve ergonomics and comfort, relieve lower back pressure, and ease of donning and doffing. Shoulder straps 244 extend over the shoulder and affix to backpack assembly 242 with sewing, rivets, buckles, buttons, adhesive, VELCRO™, or other secure attachment mechanism. Shoulder straps 244 can slide relative to backpack assembly 242 for user comfort. Buckles 246 in shoulder straps 244 provide adjustment and attachment points. Buckles 246 can be used to adjust elastic pre-load (strength of the suit when squatting down) and enable P2K 232 to fit different body sizes. Back support 250 connects to backpack assembly 242 with sewing, rivets, buckles, buttons, adhesive, VELCRO™, or other secure attachment mechanism. Side straps 252 extend from shoulder straps 244 to back support 250. Side straps 252 can include elastic material with buckles for adjustments and comfort, see FIG. 11a. Back support 250 slides or moves relative to backpack assembly 242 to minimize medial/lateral relative motion and provide pre-tensioning.

Leg strap arrangement 258 extends down the legs of user 230. Leg straps 258 include thigh portion 258a over the gluteal area and hamstrings of user 230, knee portion 258b over the front of the knee area, and calf portion 258c over the calf area. Thigh portion 258a connects to back support 250 with sewing, rivets, buckles, buttons, adhesive, VELCRO™, or other secure attachment mechanism. Seat webbing 254 is connected to back support 250 and thigh portion 258a with sewing, rivets, buckles, buttons, adhesive, VELCRO™, or other secure attachment mechanism. Seat webbing 254 is an elastic material for storing and releasing power and comfortable load distribution. Knee portion 258b includes a knee pad for knee protection while kneeling on the ground. Leg straps 258 utilize the bending motion of the ankle and knee for maximum stretching of the elastic bands. Foot anchor 260 connects to calf portion 258c behind the heel with sewing, rivets, buckles, buttons, adhesive, VELCRO™, or other secure attachment mechanism. Foot anchor 260 crosses over the talus and then wraps around the arch. Foot anchor 260 can be configured to connect to a shoe, boot, or directly to the foot.

The various straps and belts in FIGS. 10a-10c can be implemented using fabric or leather material, elastic bands, cables, or other suitable flexible connecting members. P2K 232 stores potential energy in the strapping arrangement, e.g., the elastic strapping stretches and stores potential energy when transitioning from a standing position to a crouched, squatting, or seated position. The potential energy in P2K 232 remains available while user 230 is seated to help with the opposing motion, i.e., standing up under load. When user 230 stands up from the seated position under load, similar to FIG. 2b, the potential energy in P2K 232 is released to assist the user in the motion. P2K 232 reduces the effort, strain, fatigue, and potential for injury associated such movement in physical labor work environments.

Figure 11C:
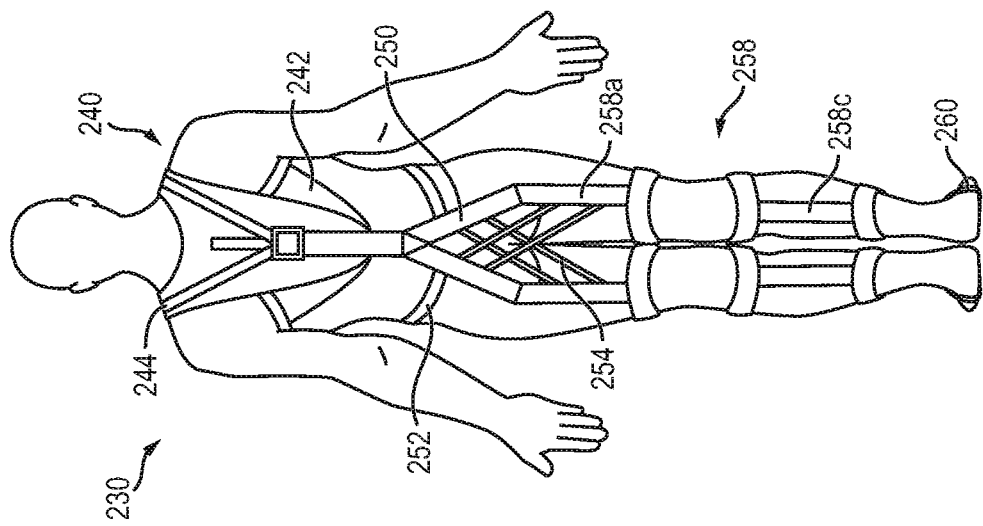
FIGS. 11a-11c illustrate a seventh embodiment of the passive P2K suit with a backpack assembly and split knee pad.
Figure 11B:
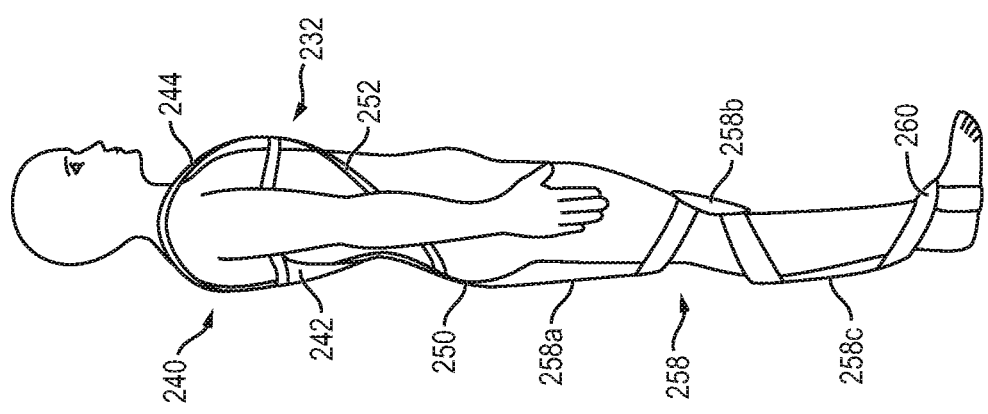
Figure 11A:
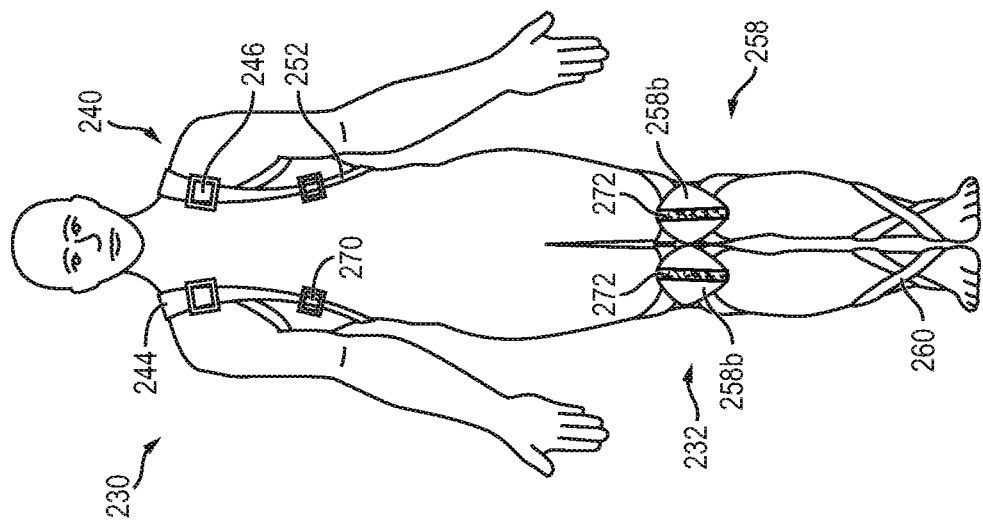

FIGS. 11a-11c illustrate another embodiment of user 230 wearing P2K 232 with buckles 270 in side straps 252. Buckles 270 in combination with elastic material in side straps 252 provide further adjustments, support, and comfort for user 230 in donning, doffing, and wearing upper torso harness 240 and backpack assembly 242. Side straps 252 with buckles 250 keep back support 250 and seat webbing 254 in place during motion, e.g. while walking. Knee portion 258b includes connection point 272 to connect and separate a left half of the knee pad and a right half of the knee pad, which aids with donning and doffing leg strap arrangement 258. For example, user 230 brings the left half of the knee pad and the right half of the knee pad together and secures with connection point 272. To remove leg strap arrangement 258, user 230 detaches the left half of the knee pad from right half of the knee pad at connection point 272. Connection point 272 can be VELCRO™, buckles, buttons, or other removable attachment mechanism.

While one or more embodiments of the present invention have been illustrated in detail, the skilled artisan will appreciate that modifications and adaptations to those embodiments may be made without departing from the scope of the present invention as set forth in the following claims.

What is claimed:
1. A human assistance device, comprising:
an upper torso harness configured to attach to a user;
a first back support strap and a second back support strap connected to a common point on the upper torso harness and configured to extend down a lower back of the user; and
a leg strap arrangement connected to the first back support strap and second back support strap, wherein the leg strap arrangement includes,
 (a) a first upper leg strap connected to the first back support strap and configured to extend down a first backside hamstring of the user,
 (b) a second upper leg strap connected to the second back support strap and configured to extend down a second backside hamstring of the user,
 (c) a first upper knee strap connected to the first upper leg strap and configured to extend around a first portion of a first leg of the user above a first knee of the user,
 (d) a second upper knee strap connected to the second upper leg strap and configured to extend around a first portion of a second leg of the user above a second knee of the user,
 (e) a first knee pad connected to the first upper knee strap and configured to cover the first knee of the user,
 (f) a second knee pad connected to the second upper knee strap and configured to cover the second knee of the user,
 (g) a first lower knee strap connected to the first knee pad and configured to extend around a second portion of the first leg of the user below the first knee of the user,
 (h) a second lower knee strap connected to the second knee pad and configured to extend around a second portion of the second leg of the user below the second knee of the user,
 (i) a first calf strap connected to the first lower knee strap and configured to extend down a first backside calf of the user, and
 (j) a second calf strap connected to the second lower knee strap and configured to extend down a second backside calf of the user, wherein the upper torso harness and leg strap arrangement are passive.
2. The human assistance device of claim 1, wherein the upper torso harness includes a shoulder strap.
3. The human assistance device of claim 1, wherein the upper torso harness includes a backpack assembly.
4. The human assistance device of claim 1, wherein the leg strap arrangement includes an elastic material.

5. The human assistance device of claim 1, wherein the first knee pad includes a connection point to separate a left portion of the first knee pad from a right portion of the first knee pad.

6. The human assistance device of claim 5, wherein the connection point extends a length of the first knee pad.

7. The human motion assistance device of claim 1, wherein the first upper knee strap and second upper knee strap extend to the first knee pad at two locations on an upper portion of the first knee pad and the first lower knee strap and second lower knee strap extend to the first knee pad at two locations on a lower portion of the first knee pad.

8. The human motion assistance device of claim 1, further including a seat webbing connected between the first back support strap and second back support strap and the first upper leg strap and second upper leg strap.

9. A human motion assistance device, comprising:
an upper torso harness configured to attach to a user;
a first back support strap and a second back support strap connected to a common point on the upper torso harness and configured to extend down a lower back of the user; and
a leg strap arrangement connected to the first back support strap and second back support strap, wherein the leg strap arrangement includes,
(a) a plurality of upper leg straps connected to the first back support strap and second back support straps respectively and configured to extend down a first backside hamstring of the user,
(b) a plurality of upper knee straps connected to the upper leg straps and configured to extend around a first portion of legs of the user above knees of the user,
(c) a plurality of knee pads connected to the upper knee straps and configured to cover the knees of the user,
(d) a plurality of lower knee straps connected to the knee pads and configured to extend around a second portion of the legs of the user below the knees of the user, and
(e) a plurality of calf straps connected to the lower knee straps and configured to extend down backside calves of the user.

10. The human motion assistance device of claim 9, wherein the upper torso harness includes a shoulder strap.

11. The human motion assistance device of claim 9, wherein the upper torso harness includes a backpack assembly.

12. The human motion assistance device of claim 9, wherein the leg strap arrangement includes an elastic material.

13. The human motion assistance device of claim 9, further including a plurality of foot anchors connected to the calf straps.

14. The human assistance device of claim 9, wherein the knee pads each include a connection point to separate a left portion of the knee pads from a right portion of the knee pads.

15. The human assistance device of claim 14, wherein the connection point extends a length of the knee pads.

16. The human motion assistance device of claim 9, wherein the upper knee straps extend to the knee pads at two locations on an upper portion of the knee pads and the lower knee straps extend to the knee pads at two locations on a lower portion of the knee pads.

17. The human motion assistance device of claim 9, further including a seat webbing connected between the first back support strap and second back support strap and the upper leg straps.

18. A human assistance device, comprising:
an upper torso harness configured to attach to a user;
a first back support strap and a second back support strap connected to a common point on the upper torso harness and configured to extend down a lower back of the user;
a leg strap assembly connected to the first back support strap and second back support strap and configured to extend down a backside leg area of the user, wherein the upper torso harness and leg strap arrangement are passive;
a seat webbing connected between the first back support strap and second back support strap and the leg strap assembly; and
a knee pad configured to cover a knee of the user, wherein the leg strap assembly extends to the knee pad at two locations on an upper portion of the knee pad and at two locations on a lower portion of the knee pad.

19. The human assistance device of claim 18, wherein the upper torso harness includes a shoulder strap.

20. The human assistance device of claim 18, wherein the upper torso harness includes a backpack assembly.

21. The human assistance device of claim 18, wherein the leg strap assembly includes an elastic material.

* * * * *